(12) United States Patent
Zhang et al.

(10) Patent No.: US 7,136,541 B2
(45) Date of Patent: Nov. 14, 2006

(54) METHOD OF PERFORMING SUB-PIXEL BASED EDGE-DIRECTED IMAGE INTERPOLATION

(75) Inventors: Huipin Zhang, Milpitas, CA (US); Cheung Auyeung, Sunnyvale, CA (US); Takao Yamazaki, Cupertino, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 768 days.

(21) Appl. No.: 10/273,781

(22) Filed: Oct. 18, 2002

(65) Prior Publication Data

US 2004/0076343 A1 Apr. 22, 2004

(51) Int. Cl.
*G06K 9/32* (2006.01)

(52) U.S. Cl. .............. 382/300; 382/190; 382/205; 358/3.27; 358/525

(58) Field of Classification Search ................ 382/266, 382/269, 282, 300, 190, 195, 199, 205; 358/525, 358/3.27
See application file for complete search history.

(56) References Cited

U.S. PATENT DOCUMENTS

| | | | |
|---|---|---|---|
| 5,727,093 A * | 3/1998 | Uchiyama et al. | 382/294 |
| 5,793,435 A * | 8/1998 | Ward et al. | 348/448 |
| 5,936,676 A * | 8/1999 | Ledinh et al. | 348/452 |
| 5,953,465 A * | 9/1999 | Saotome | 382/200 |
| 5,959,670 A * | 9/1999 | Tamura et al. | 348/364 |
| 5,970,179 A * | 10/1999 | Ito | 382/261 |
| 6,091,862 A | 7/2000 | Okisu | |
| 6,167,088 A | 12/2000 | Sethuraman | |
| 6,262,773 B1 * | 7/2001 | Westerman | 348/448 |
| 6,310,962 B1 | 10/2001 | Chung et al. | |
| 6,507,364 B1 * | 1/2003 | Bishay et al. | 348/242 |
| 6,570,616 B1 * | 5/2003 | Chen | 348/272 |
| 6,744,916 B1 * | 6/2004 | Takahashi | 382/162 |
| 6,810,156 B1 * | 10/2004 | Itoh | 382/300 |

* cited by examiner

*Primary Examiner*—Samir Ahmed
*Assistant Examiner*—Yosef Kassa
(74) *Attorney, Agent, or Firm*—John P. O'Banion

(57) ABSTRACT

A method of generating a value for a missing pixel "x" by determining a "least harmful" local edge direction between pixels, or sub-pixels, on substantially opposing sides of the missing pixel, and interpolating the difference to arrive at a value for pixel "x". The method involves generating sub-pixel values for locations within neighboring pixels, the sub-pixels may comprise half-pixels, quarter-pixels, three-quarter pixels, and so forth, wherein any fractional pixel quantity may be created. Absolute difference values are calculated between neighboring pixels, or sub-pixel values, to determine a least harmful local edge direction along which a value is generated for pixel "x" by interpolation.

28 Claims, 4 Drawing Sheets

METHOD OF PERFORMING SUB-PIXEL BASED EDGE-DIRECTED IMAGE INTERPOLATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention generally relates to the processing of image sequences, and more particularly to a method of edge-directed image interpolation utilizing sub-pixel directions.

2. Description of the Background Art

Digital image information is typically represented in a series of frames which each contain an array of pixels. Information about specific image characteristics are then maintained for each pixel within the frame. Typically, these image characteristics provide intensity, and/or color information. In one image format, each pixel is represented as a mixture of three colors that are each defined by eight-bit color values. A number of standards are available for representing images in a series of frames. In certain situations, a frame may contain one or more pixels for which no image information is available. To minimize image degradation within these frames, the information for the missing pixels is generated by interpolating the characteristics of adjacent pixels.

Pixel information within a frame may be missing for a variety of reasons, including losses or boundary conditions that may result when executing a video conversion process, such as the conversion between interlaced television field signals and progressive frame signals. The interlaced scanning format is widespread and provides transmission advantages, however, it suffers from a lack of vertical resolution and often produces image artifacts such as line flicker. Therefore, interlaced images are often converted to progressive frame signals by performing an interlaced-to-progressive conversion (IPC) method. Execution of an IPC method can improve vertical resolution while reducing line flicker and other image artifacts. The conversion of an interlaced video format to a progressive format typically creates one or more rows of missing pixel data, such as near the top or bottom of a frame. Maintaining high video picture quality requires that the image characteristics of the missing pixels be replaced with an approximation of the missing pixel information that is capable of properly blending with the image so that minimal adverse viewing effects are incurred. Although pixel interpolation is utilized in the process of converting interlaced streams to progressive scan streams, it should be appreciated that pixel interpolation is generally applicable to a number of situations in which pixel information is otherwise missing, or in error. The generation of missing pixel information is typically performed by executing a pixel interpolation method within a software routine that executes on an image processing device.

One conventional pixel interpolation method, referred to as edge-directed interpolation, seeks to generate a value for a missing pixel by extending the color patterns in selected directions, expressed as color edges which exist in the surrounding pixels of an image frame. A pixel "x" for which color information is not available is shown surrounded by neighboring pixels in FIG. 1, which illustrates candidate edge directions associated with conventional edge-directed interpolation. Each of the neighboring pixels is adjacent the missing pixel with a common edge or corner. The value assigned to pixel "x" is registered by determining and then following one of the local edges defined along one of the pixel paths (a–f), (b–e), or (c–d). It should be appreciated that the illustrated pixel paths may be rotated by ninety degrees if information was missing for a segment of vertical pixels instead of the more common horizontal pixels. The selection of which local edge to use for interpolation is performed by determining which is the "least harmful" local edge direction. The term "least harmful" may be characterized by the generated pixel being created in relation to the surrounding pixels so as to have the least harmful effect on the resultant image, wherein the peak signal to noise ratio (PSNR) for the frames within a video stream is maximized, and thus less signal degradation from the original images occurs. The "least harmful" local edge is detected by finding the edge direction in which the difference between the neighboring pixel values on opposite sides of the missing pixel is at its lowest value, minimized. The interpolation is thereafter performed by finding the average of the neighboring pixels along the "least harmful" local edge. It should be appreciated that "averaging" or other normalizations described herein are performed according to the type of pixel image data being represented. For example, averaging a pixel whose color is expressed as an RGB value comprises averaging each of the separate color values of red, green, and blue to arrive at a result that is also expressed as an RGB value. Similarly, other image representations systems, such as CYMK and others, are averaged to create a resultant value whose displayed characteristics are substantially between that of the pixel values being averaged. The formula of Eq. (1) illustrates the conventional generation of a value for pixel "x" by interpolation along a "least harmful" edge as selected from three prospective edge directions.

$$x = \begin{cases} \frac{a+f}{2} & \text{if } ((|a-f| < |c-d|) \wedge (|a-f| < |b-e|)) \\ \frac{c+d}{2} & \text{if } ((|c-d| < |a-f|) \wedge (|c-d| < |b-e|)) \\ \frac{b+e}{2} & \text{otherwise} \end{cases} \quad (1)$$

The current method of performing edge-directed pixel interpolation can be executed readily with minor per-pixel computational overhead, however, the resultant images are generated with distortions that may be characterized, for example, by a signal-to-noise ratio that is often insufficient for the given application.

Therefore, a method is needed to enhance edge-directed pixel interpolation to increase image quality. The present invention satisfies those needs, as well as others, and overcomes the deficiencies of previously developed general image interpolation methods.

BRIEF SUMMARY OF THE INVENTION

The present invention provides a method of increasing the accuracy of edge-directed pixel interpolation by considering edges defined in relation to sub-pixels. The conventional edge-directed pixel value interpolation techniques constrain the interpolation of a missing pixel value to a series of three directions which include a vertical edge and two diagonal edge paths that are defined between pixels. The conventional pixel-based candidate edge directions follow through the center of neighboring pixels on opposing sides of the missing pixel. The present invention, by contrast, performs edge-directed interpolation in which one or more of the candidate local edges is defined between sub-pixel entities. The consideration of sub-pixel entities within the present invention allows for increasing the accuracy of the resultant pixel interpolation process. By way of example, the sub-pixel entities may comprise half-pixels, quarter-pixels, three-quarter-pixels, one-eighth-pixels, and so forth, to render any desired pixel division. The sub-pixel value is generated as an average between neighboring pixel values, and has a virtual pixel position within the neighboring pixels which is dependent on the weighting factor used for taking the average. For example, a half-pixel value may be obtained by a non-weighted average of two adjacent pixels a and b by computing a non-weighted average (a+b)/2, and the half-pixel has a virtual pixel position that lies halfway between the centers of the two pixels a and b, which is at the boundary between the two pixels. It will be appreciated that other sub-pixel divisions such as quarter-pixels, eighth-pixels, and so forth, have a virtual pixel position between neighboring pixels according to the specific sub-pixel division. The amount of sub-pixel division is determined in response to the weighting of the average which is computed for the sub-pixel. By way of further example, a quarter-pixel between two neighboring pixels a and b may be computed as a weighted average (3a+b)/4, wherein the virtual pixel position lies one-quarter of the distance between pixel a and pixel b. It will be appreciated, however, that sub-pixels may be computed from averages among more than two neighboring pixels without departing from the present invention. It will be appreciated that the incorporation of half-pixels within the interpolation process introduces two additional local edge directions that may be followed when generating the value for the missing pixel. Use of half-pixels allows for the selection of edges from among the three directions of angles π/4, π/2, 3π4, which comprise the three conventional edge directions, along with two additional directions that connect half-pixels. It should be appreciated that the addition of sub-pixel directions in some cases will increase the computational complexity of the pixel interpolation process. However, it should also be appreciated that computational complexity may be trimmed to any desired level by tailoring the number and character of the directions being evaluated. It has been experimentally determined, for example, that a high peak signal-to-noise ratio may be achieved by interpolation between the skewed half-pixel directions in addition to the conventional full-pixel vertical direction, while eliminating the conventional full-pixel skew directions (a–f) and (c–d). Although the sub-pixel values are preferable created as a weighted average, non-weighted average, or similar normalization mechanism between two adjacent pixels, it should be appreciated that a sub-pixel value may comprise the creation of a normalized value from more than two pixels, such as from three or four pixels. General application of the sub-pixel interpolation method of the present invention is provided by creating sub-pixel values which are nearby pixel "x" for which image information is missing or in error, evaluating candidate local edge directions bounded by sub-pixels along with conventional full-pixel edge directions to determine a "least harmful" edge along which interpolation is performed to generate a substitute pixel value. The interpolation is preferably performed by averaging a weighted, or non-weighted, sum of neighboring pixels along the "least harmful" edge. It should be appreciated that candidate local edge directions may be limited to include only sub-pixel edge directions, although the candidate local edge directions preferably include one or more full-pixel edge directions.

An object of the invention is to increase the accuracy of edge-directed pixel interpolation within images subject to missing pixels.

Another object of the invention is to provide increased interpolation accuracy without undue computational burden.

Another object of the invention is to provide an edge-directed pixel interpolation method that may be utilized during interlaced-to-progressive conversion (IPC) to improve image quality.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 2 through FIG. 6. It will be appreciated that the apparatus may vary as to configuration and as to details of the parts, and that the method may vary as to the specific steps and sequence, without departing from the basic concepts as disclosed herein.

The accuracy of pixel interpolation within an image frame may be increased by increasing the number of candidate local edge directions within which a "least harmful" edge may be selected. The present invention increases, or alters, the directions of candidate local edges by considering edges that are defined by neighboring sub-pixel locations. Each sub-pixel location may be generated by taking weighted averages, non-weighted averages, or similar normalization calculations, within a group of pixels. It will be appreciated that numerous candidate local edge arrangements may be configured with the combination of full-pixel and sub-pixels that define a candidate local edge. The largest evenly divisible sub-pixel fraction is the half-pixel, whose location is considered to exist at the junction of two adjacent pixels which are neighbors of pixel "x" for which image characterization information is either missing or in error. In addition, any arbitrary pixel division increment may be supported, such as quarters, fifths, eighths, tenths, and so forth.

Figure 2:
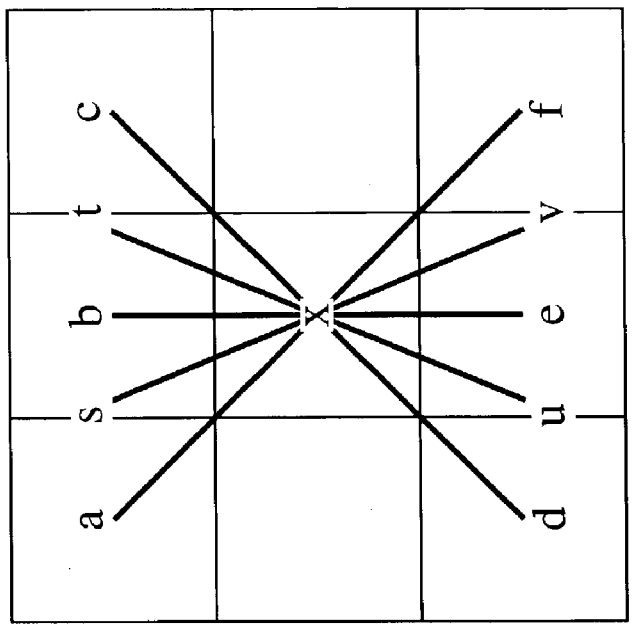
FIG. 2 is a diagram of sub-pixel edge-directed interpolation according to an aspect of the present invention, showing the use of half-pixel local-edge resolution.
Figure 1:
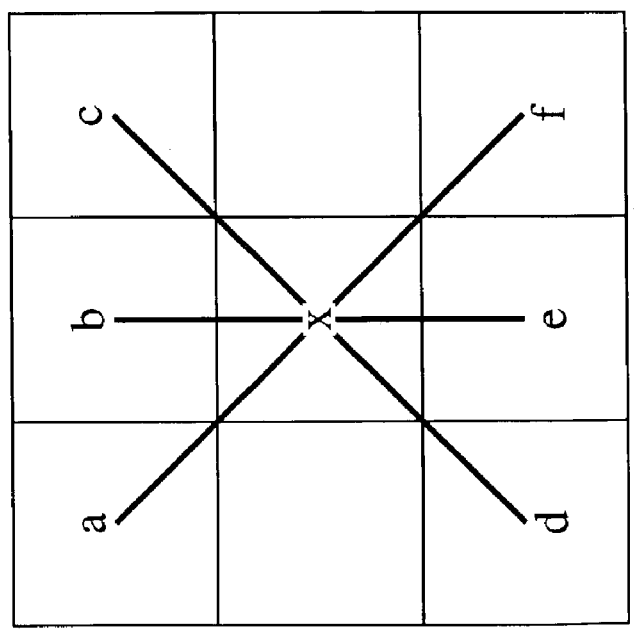
FIG. 1 is a diagram of conventional edge-directed pixel interpolation along the least harmful edge.

FIG. 2 exemplifies the inclusion of local edge directions associated with half-pixel interpolation directions that connect half-pixels (s–v) and (t–u) as neighbors of unknown pixel value "x". The candidate edge directions shown are all centered on missing pixel "x" with a known pixel, or sub-pixel value, defining each end of a given edge. Half-pixel values, for example, may be derived from weighted or non-weighted averages of adjacent pixels. The following equations (Eq. 2–Eq. 5) exemplify one simple method of generating half-pixel values by averaging adjacent pixels:

$$s = \frac{a+b}{2} \quad (2)$$

$$t = \frac{b+c}{2} \quad (3)$$

$$u = \frac{d+e}{2} \quad (4)$$

$$v = \frac{e+f}{2} \quad (5)$$

The addition of two new sub-pixel directions to the formula of Eq. (1) allows the selection of a "least harmful" local edge from a total of five local edges. It should be appreciated that the ends of a prospective edge need not terminate at equivalent pixel fractions, however, the use of different pixel offsets would result in a non-centered alignment of the edge within the missing pixel "x". The formula of Eq. 6 can be followed to determine a "least harmful" local edge from a total of five edge directions, along which a value is generated for pixel "x" by interpolation.

$$x = \begin{cases} \frac{a+f}{2} & \text{if } ((|a-f|<|s-v|) \wedge (|a-f|<|b-e|) \wedge (|a-f|<|t-u|) \wedge (|a-f|<|c-d|)) \\ \frac{s+v}{2} & \text{if } ((|s-v|<|a-f|) \wedge (|s-v|<|b-e|) \wedge (|s-v|<|t-u|) \wedge (|s-v|<|c-d|)) \\ \frac{t+u}{2} & \text{if } ((|t-u|<|a-f|) \wedge (|t-u|<|s-v|) \wedge (|t-u|<|b-e|) \wedge (|t-u|<|c-d|)) \\ \frac{c+d}{2} & \text{if } ((|c-d|<|a-f|) \wedge (|c-d|<|s-v|) \wedge (|c-d|<|b-e|) \wedge (|c-d|<|t-u|)) \\ \frac{b+e}{2} & \text{otherwise} \end{cases} \quad (6)$$

The interpolation is exemplified as a non-weighted average between the terminating pixels along the selected "least harmful" local edge whose image characteristics, such as color, have the closest match. The sub-pixel method can be extended to create quarter-pixels, three-quarter-pixels, eighth-pixels, and so forth in any fractional pixel divisions. The weighted sums may also be interpreted as the result of a filtering process to increase the consistency of the edge information. It should be appreciated that the number of calculations to be performed for the sub-pixels goes up geometrically as the candidate number of local edge directions increases.

The number of pixel and sub-pixel directions may be trimmed within a given application to reduce computational overhead. It should be appreciated that a reduction in edge directions may not necessarily precipitate a loss in accuracy, such as would be reflected in a lower signal-to-noise ratio. In the following implementation, which is described by the sub-pixel edge-directed interpolation method described by Eq. (7), the full-pixel skew directions (a–f) and (c–d), have been eliminated to arrive at three candidate local edge directions from which a "least harmful" local edge may be selected along which a substitute value for pixel "x" may be generated by interpolation.

$$x = \begin{cases} \frac{s+v}{2} & \text{if } ((|s-v|<|b-e|) \wedge (|s-v|<|t-u|)) \\ \frac{t+u}{2} & \text{if } ((|t-u|<|s-v|) \wedge (|t-u|<|b-e|)) \\ \frac{b+e}{2} & \text{otherwise} \end{cases} \quad (7)$$

The above equation provides an alternative form of three-direction interpolation that incorporates sub-pixel local edges according to the invention.

Figure 3:
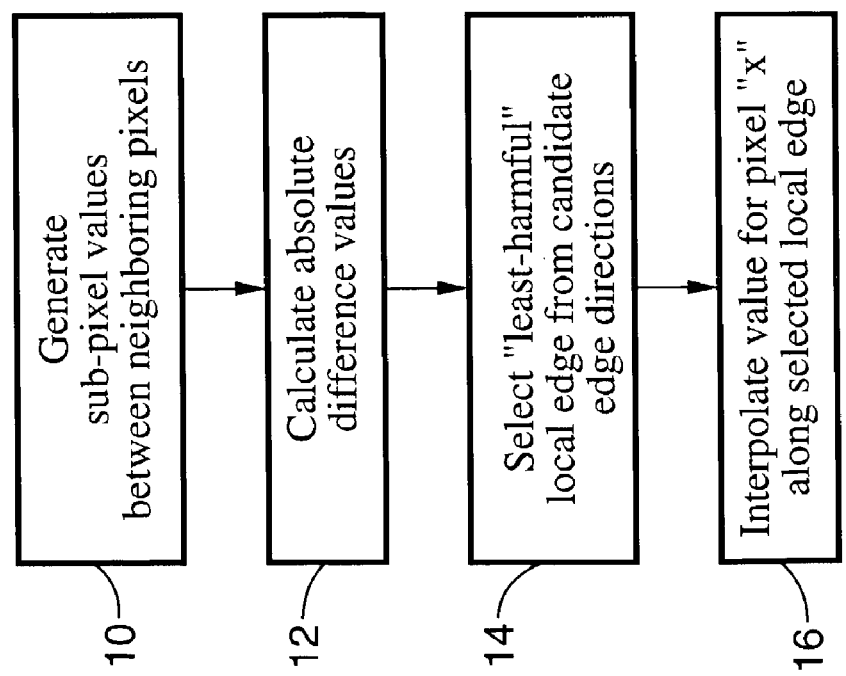
FIG. 3 is a flowchart for generating missing pixel values using sub-pixel interpolation according to an embodiment of the present invention.

FIG. 3 illustrates the generalized method steps for generating values for a missing pixel "x" according to the present interpolation method which includes the use of sub-pixel locations. The method is preferably executed as software executing on an image processing device, although it may be implemented with hardware or combinations thereof. The method determines a substitute value for a pixel "x" for which the image value is missing or in error, that has neighboring pixels a, b, c, d, e, and f. Sub-pixel values are generated at block 10, such as half-pixel values s, t, u, v. Prospective edge directions are defined between the variously defined pixels and sub-pixels which terminate on opposing sides of the missing pixel "x". Absolute difference values are calculated at block 12 for the desired local edge directions to be considered. Finding the "least harmful" local edge at block 14 between terminating pixels, or sub-pixels, comprises finding which prospective local edge has the least difference in image characteristics, such as color, or intensity, between the pixels which terminate each end of the prospective edge. Once the "least harmful" edge is determined, then a value for pixel "x" may be generated by interpolation at block 16. A simple form of interpolation between a single pair of endpoints may be created by averaging the value of the endpoints to arrive at a value for missing pixel "x". Sub-pixels of various granularities may be considered for use within the invention, such as half-pixel, quarter-pixel, and so forth.

Figure 4:
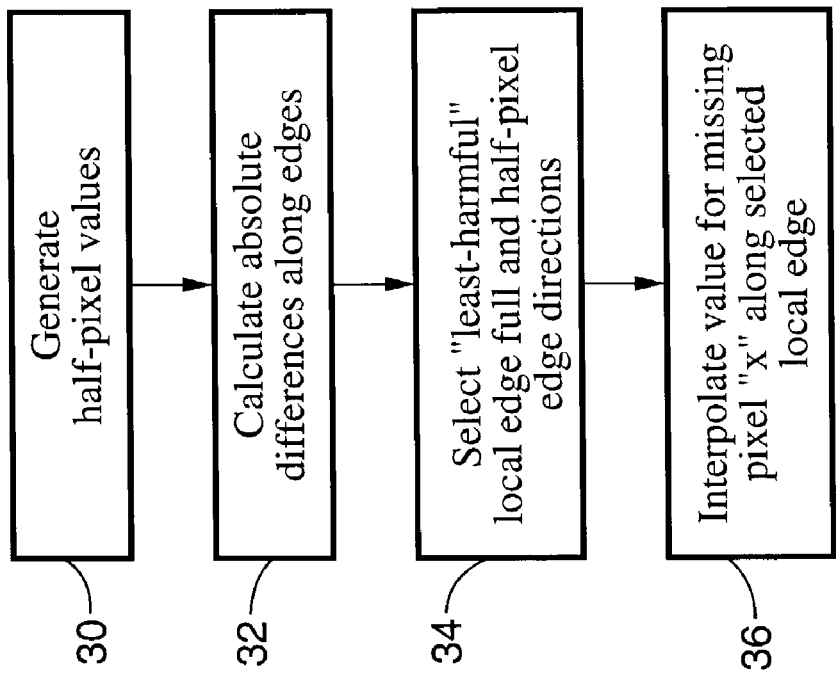
FIG. 4 is a flowchart for generating missing pixel values utilizing half-pixel interpolation according to an aspect of the present invention.

FIG. 4 illustrates a method for generating a value for missing pixel "x" by using edge-directed half-pixel interpolation. A set of half-pixel end-point values are determined at block 30, the absolute differences of which, along with the desired full-pixel values, are calculated at block 32. The "least harmful" local edge is determined at block 34, and a value for missing pixel "x" is interpolated at block 36.

Figure 5:
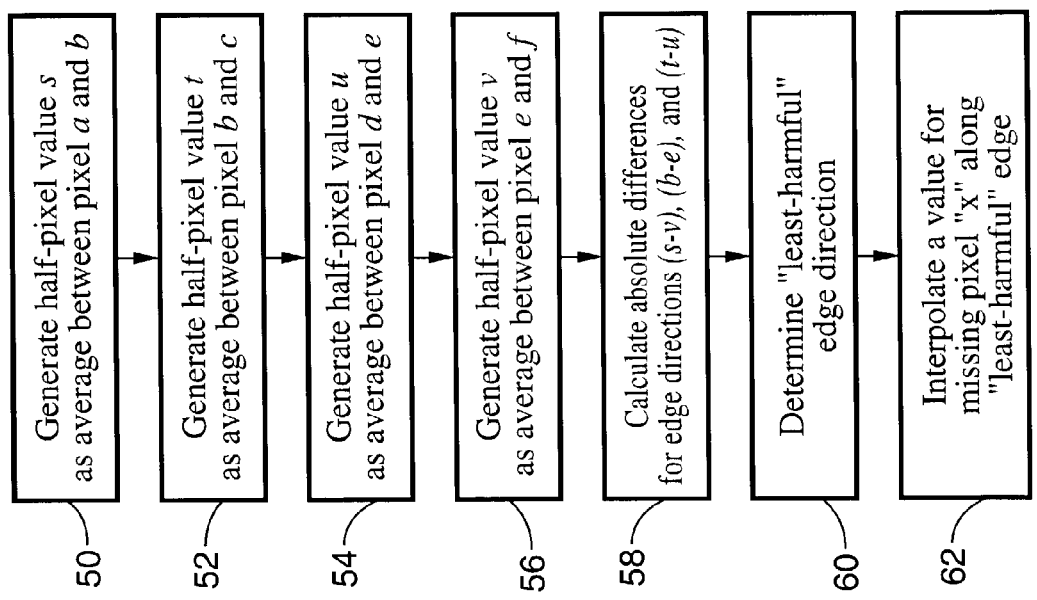
FIG. 5 is a flowchart for generating missing pixel values utilizing half-pixel interpolation according to an aspect of the present invention.

FIG. 5 illustrates in detail an aspect of the present inventive method for generating a value to replace the missing value for pixel "x" from three candidate local edge directions comprising two half-pixel edge directions and a vertical full-pixel direction. The following half-pixel values are generated. Half-pixel value s is generated between pixel a and b at block 50; half-pixel t is generated between pixel b and c at block 52; half-pixel u is generated between pixel d and e at block 54; and half-pixel v is generated between pixel e and f at block 56. Absolute differences are calculated for edge directions (s–v), (b–e), and (t–u) at block 58, from which the "least harmful" local edge is determined that has the least absolute difference within the directions (s–v), (b–e), and (t–u) at block 60. A substitute value for pixel "x" is determined by an interpolation process, such as by an averaging computation, or similar normalization computation, applied to the pixel, and/or sub-pixel, values along the local edge at block 62.

Figure 6:
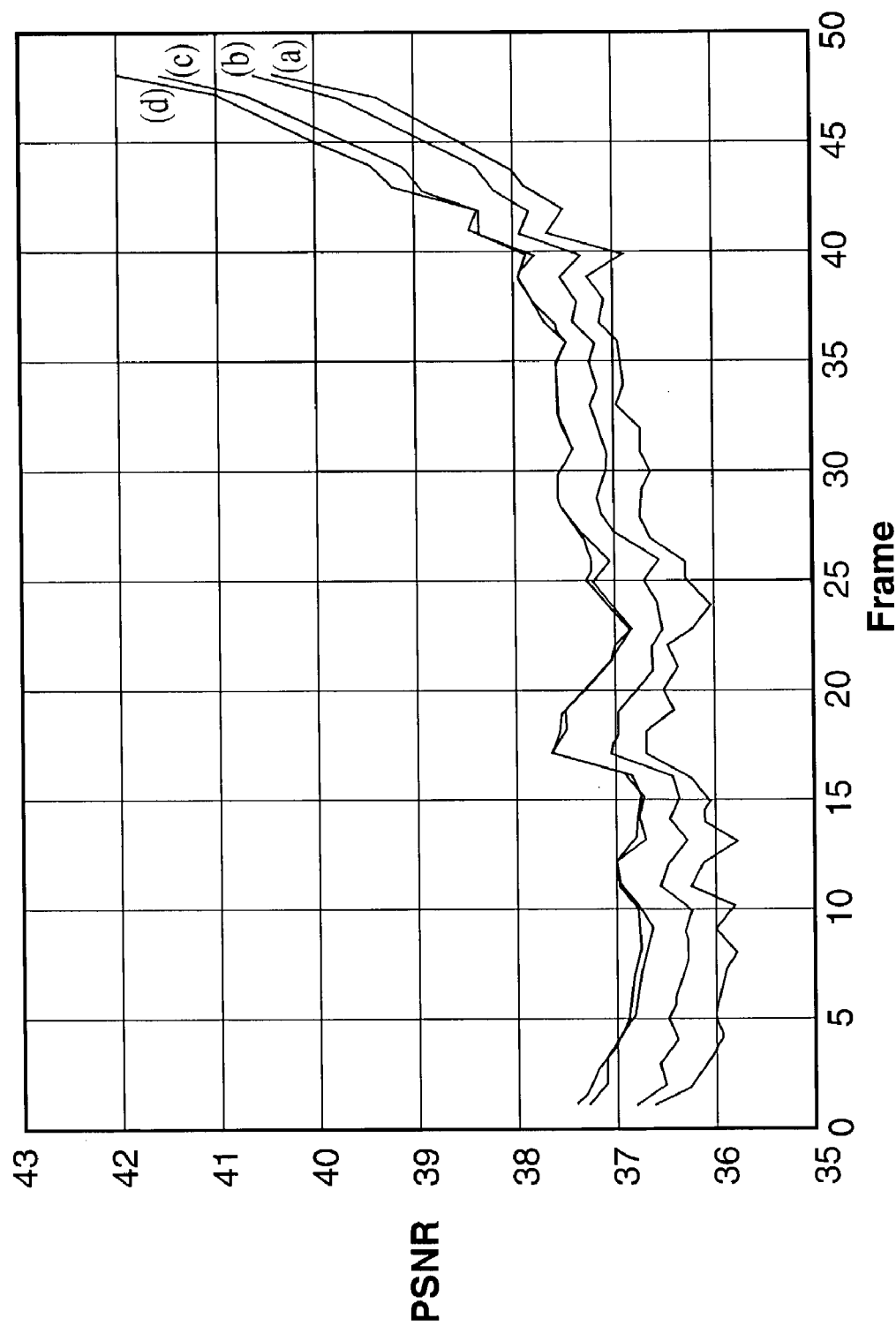
FIG. 6 is a graph of peak signal-to-noise ratio (PSNR) for each of four different edge-directed interpolation methods.

Experiments were performed to compare conventional, full-pixel only, edge-directed pixel interpolation method with selected sub-pixel edge-directed interpolation methods according to the present invention. FIG. 6 depicts four curves, (a–d), for which missing rows of pixels were replaced within fifty frames (50 frames) of a first video test clip of a sitcom, the test clip is herein referred to as "Susie". The curves depict the peak signal-to-noise ratio (PSNR) measured for each frame within fifty frames of the "Susie" video test segment. It should be appreciated that the selected video clip "Susie" was a test clip utilized to provide a common baseline for comparison, and that similar comparative results are anticipated with similar video segments. The curves in FIG. 6 represent (a) a conventional pixel-based edge detection method, (b) inclusion of half-pixels to create five pixel directions, (c) replacing the full-pixel diagonal edges with half-pixels based diagonals wherein three edge directions are represented, and (d) the inclusion of quarter-pixel directions. Edge-directed interpolation utilizing quarter-pixels provides a larger number of candidate edge directions than either conventional or half-pixel edge-directed interpolation and resulted in the best image accuracy of the four tested interpolation methods with a PSNR that averaged about 0.9 dB higher than the conventional edge-detection method within the "Susie" test clip. It should be appreciated, however, that the performance of half-pixel based edge interpolation utilizing only three total directions provided better performance than either the conventional edge-detection method, or the half-pixel edge detection method having five directions. This improvement may be a result of altering the amount of redundancy, since the new two sub-pixel directions are derived from existing full-pixel directions. Additional testing was performed on other images, such as a video clip of a fishing boat, referred to as a "boats" image. The use of quarter-pixel edge-directed interpolation on the "boats" image yielded a 3 dB increase in PSNR. The greatly increased performance of sub-pixel interpolation with the "boats" image was anticipated due to the high-contrast vertical and diagonal features, specifically the masts and rigging of the boats depicted within the "boats" image that were not present in the "Susie" sitcom video test clip.

Accordingly, it will be seen that this invention provides for the generation of image information which may be substituted for pixels for which the image information is missing, such as may result from performing a conversion from an interlaced video format to a progressive video format. Pixel values are generated utilizing an edge-directed interpolation method which incorporates the use of sub-pixel candidate edge directions. The invention describes a general method for altering edge directions, or increasing the number of edge directions which may be considered during the interpolation process. The described embodiments of the invention exemplify the use of half-pixel and quarter-pixel locations, however, it should be appreciated that the invention teaches a generalized method of utilizing any desired fractional-value sub-pixel. The method is illustrated by way of example for generating a missing pixel value from within a missing row of pixels, such as would arise in the conversion process between an interlaced video format and a progressive format, however, the method may be utilized for interpolating a value for a missing pixel which is bounded by any combination of neighbors for which sub-pixel locations exist. It should be appreciated that edge-directed detection and interpolation according to the present invention may be utilized in image conversion applications along with image processing applications in general.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of generating image characteristics for a missing pixel "x" by interpolating the image values of neighboring pixels, comprising:

generating an image value for a sub-pixel located at virtual pixel positions between neighboring pixels within an image frame by averaging, or equivalent;

selecting a local edge direction, along which the lowest difference in pixel or sub-pixel value exists from within a set of candidate edge directions including at least one edge direction which incorporates sub-pixel values; and interpolating a value for said missing pixel "x" along said selected local edge.

2. A method as recited in claim 1, wherein said average value is computed as a non-weighted average between at least two adjacent pixels.

3. A method as recited in claim 2, wherein said non-weighted average is computed as a non-weighted average between two adjacent pixels to generate a half-pixel value.

4. A method as recited in claim 1, wherein said neighboring pixels comprise adjacent pixels that may be referred to as a, b, and c in a pixel row above said pixel "x" and adjacent pixels that may be referred to as d, e, and f in a pixel row below said pixel "x".

5. A method as recited in claim 4, wherein said half-pixel values are calculated by the equations, or equivalents, wherein s=(a+b)/2, t=(b+c)/2, u=(d+e)/2, v=(e+f)/2.

6. A method as recited in claim 5, wherein the interpolated value for missing pixel "x" is determined from three candidate edge directions according to the relationship comprising:

$$x = \begin{cases} \frac{s+v}{2} & \text{if } ((|s-v| < |b-e|) \wedge (|s-v| < |t-u|)) \\ \frac{t+u}{2} & \text{if } ((|t-u| < |s-v|) \wedge (|t-u| < |b-e|)) \\ \frac{b+e}{2} & \text{otherwise} \end{cases}.$$

7. A method as recited in claim 5, wherein the interpolated value for missing pixel "x" is determined from within five candidate edge directions as given by:

$$x = \begin{cases} \frac{a+f}{2} & \text{if } ((|a-f| < |s-v|) \wedge (|a-f| < |b-e|) \wedge (|a-f| < |t-u|) \wedge (|a-f| < |c-d|)) \\ \frac{s+v}{2} & \text{if } ((|s-v| < |a-f|) \wedge (|s-v| < |b-e|) \wedge (|s-v| < |t-u|) \wedge (|s-v| < |c-d|)) \\ \frac{t+u}{2} & \text{if } ((|t-u| < |a-f|) \wedge (|t-u| < |s-v|) \wedge (|t-u| < |b-e|) \wedge (|t-u| < |c-d|)) \\ \frac{c+d}{2} & \text{if } ((|c-d| < |a-f|) \wedge (|c-d| < |s-v|) \wedge (|c-d| < |b-e|) \wedge (|c-d| < |t-u|)) \\ \frac{b+e}{2} & \text{otherwise} \end{cases}.$$

8. A method as recited in claim 1, wherein said average comprises a weighted average between at least two adjacent pixels.

9. A method of generating an image value for a missing pixel "x" by interpolating image values between neighboring pixels, comprising:

generating sub-pixel values as average values at virtual pixel positions between adjacent pixels;

calculating absolute difference values along predetermined candidate edge directions substantially centered on said missing pixel "x";

wherein at least one of said candidate edge directions incorporate at least one sub-pixel value;

determining a "least harmful" local edge from amongst said candidate edge directions which generally corresponds with the local edge across which the lowest value of absolute difference in image characteristics exist; and interpolating a value for pixel "x" along said "least harmful" edge by computing an average, or equivalent normalization computation, for the values along said selected local edge.

10. A method as recited in claim 9, wherein said sub-pixel values are generated as an average value for at least two pixels.

11. A method as recited in claim 10, wherein the average value comprises a non-weighted average between at least two adjacent pixels.

12. A method as recited in claim 11, wherein the pixels neighboring said pixel "x" comprise pixels that may be referred to as a, b, and c in a pixel row above said pixel "x" and pixels that may be referred to as d, e, and f in a pixel row below said pixel "x".

13. A method as recited in claim 12, wherein non-weighted average values are generated as half-pixel values between two adjacent pixels, comprising (a–b), (b–c), (d–e), and (e–f).

14. A method as recited in claim 13, wherein the half-pixel values are given by the equations, or equivalents, wherein s=(a+b)/2, t=(b+c)/2, u=(d+e)/2, v=(e+f)/2.

15. A method as recited in claim 14, wherein the value is interpolated for pixel "x" by averaging the values of neighboring pixels, or sub-pixel values, along a line that may be considered the least harmful edge.

16. A method as recited in claim 15, wherein the interpolated value for missing pixel "x" is determined from three candidate edge directions according to the relationship comprising:

$$x = \begin{cases} \frac{s+v}{2} & \text{if } ((|s-v| < |b-e|) \wedge (|s-v| < |t-u|)) \\ \frac{t+u}{2} & \text{if } ((|t-u| < |s-v|) \wedge (|t-u| < |b-e|)) \\ \frac{b+e}{2} & \text{otherwise} \end{cases}.$$

17. A method as recited in claim 15, wherein the interpolated value for missing pixel "x" is determined from five candidate edge directions according to the relationship comprising:

$$x = \begin{cases} \frac{a+f}{2} & \text{if } ((|a-f|<|s-v|) \wedge (|a-f|<|b-e|) \wedge (|a-f|<|t-u|) \wedge (|a-f|<|c-d|)) \\ \frac{s+v}{2} & \text{if } ((|s-v|<|a-f|) \wedge (|s-v|<|b-e|) \wedge (|s-v|<|t-u|) \wedge (|s-v|<|c-d|)) \\ \frac{t+u}{2} & \text{if } ((|t-u|<|a-f|) \wedge (|t-u|<|s-v|) \wedge (|t-u|<|b-e|) \wedge (|t-u|<|c-d|)) \\ \frac{c+d}{2} & \text{if } ((|c-d|<|a-f|) \wedge (|c-d|<|s-v|) \wedge (|c-d|<|b-e|) \wedge (|c-d|<|t-u|)) \\ \frac{b+e}{2} & \text{otherwise} \end{cases}.$$

18. A method as recited in claim 9, wherein the average value comprises a weighted average between at least two adjacent pixels.

19. In a pixel interpolation method for generating an image value for a missing pixel "x" by selecting a local edge from a set of candidate edge directions, each of which are defined by a pair of opposing neighboring pixels between which said missing pixel is positioned, for which the resultant difference of image values is minimized, and interpolating an image value for said missing pixel "x" along said selected local edge, wherein the improvement comprises:
  calculating sub-pixel values for sub-pixels which are located at virtual pixel positions between adjacent pixels;
  wherein each said sub-pixel value is computed as an average of said adjacent pixels; and
  including said sub-pixel values within the candidate edge directions from which said local edge direction is selected and along which the value of missing pixel "x" is interpolated.

20. A method as recited in claim 19, wherein said value is interpolated for pixel "x" by averaging the values of neighboring pixels, or sub-pixel values, along a least harmful edge within the set of said local edges which results in a minimum loss in the signal-to-noise ratio within the associated image.

21. The improvement as recited in claim 19, wherein said sub-pixel values are generated by performing a non-weighted average between at least two adjacent pixels.

22. The improvement as recited in claim 21, wherein said sub-pixel values comprise half-pixel values which are generated by averaging between two adjacent pixels.

23. A method as recited in claim 22, wherein said pixels neighboring said pixel "x" comprise pixels that may be referred to as a, b, and c in a pixel row above said pixel "x" and pixels that may be referred to as d, e, and f in a pixel row below said pixel "x".

24. A method as recited in claim 23, wherein non-weighted average values are generated as half-pixel values between two adjacent pixels, comprising (a–b), (b–c), (d–e), and (e–f).

25. A method as recited in claim 24, wherein the half-pixel values are given by the equations, or equivalents, wherein s=(a+b)/2, t=(b+c)/2, u=(d+e)/2, v=(e+f)/2.

26. A method as recited in claim 25, wherein the interpolated value for missing pixel "x" is determined from three candidate edge directions according to the relationship comprising:

$$x = \begin{cases} \frac{s+v}{2} & \text{if } ((|s-v|<|b-e|) \wedge (|s-v|<|t-u|)) \\ \frac{t+u}{2} & \text{if } ((|t-u|<|s-v|) \wedge (|t-u|<|b-e|)) \\ \frac{b+e}{2} & \text{otherwise} \end{cases}.$$

27. A method as recited in claim 25, wherein the interpolated value for missing pixel "x" is determined from five candidate edge directions according to the relationship comprising:

$$x = \begin{cases} \frac{a+f}{2} & \text{if } ((|a-f|<|s-v|) \wedge (|a-f|<|b-e|) \wedge (|a-f|<|t-u|) \wedge (|a-f|<|c-d|)) \\ \frac{s+v}{2} & \text{if } ((|s-v|<|a-f|) \wedge (|s-v|<|b-e|) \wedge (|s-v|<|t-u|) \wedge (|s-v|<|c-d|)) \\ \frac{t+u}{2} & \text{if } ((|t-u|<|a-f|) \wedge (|t-u|<|s-v|) \wedge (|t-u|<|b-e|) \wedge (|t-u|<|c-d|)) \\ \frac{c+d}{2} & \text{if } ((|c-d|<|a-f|) \wedge (|c-d|<|s-v|) \wedge (|c-d|<|b-e|) \wedge (|c-d|<|t-u|)) \\ \frac{b+e}{2} & \text{otherwise} \end{cases}.$$

28. The improvement as recited in claim 19, wherein said sub-pixel values are generated by performing a weighted average between at least two adjacent pixels.

* * * * *